United States Patent

Nakadate et al.

Patent Number: 5,402,867
Date of Patent: Apr. 4, 1995

[54] SHOCK ABSORBER WITH AUXILIARY PORT IN GUIDE MEMBER TO CONTROL HYDRODYNAMIC FORCE

[75] Inventors: Takao Nakadate, Kanagawa; Takashi Nezu, Tokyo; Akira Kashiwagi, Kanagawa, all of Japan

[73] Assignee: Tokico Ltd., Kanagawa, Japan

[21] Appl. No.: 207,674

[22] Filed: Mar. 9, 1994

[30] Foreign Application Priority Data

Mar. 16, 1993 [JP] Japan .................. 5-081350

[51] Int. Cl.⁶ .............................. F16F 9/34
[52] U.S. Cl. ..................... 188/299; 188/319; 137/625.32
[58] Field of Search ............ 188/282, 285, 299, 319, 188/322.15, 322.22; 137/625.32; 251/129.11, 209, 283; 280/707, 714

[56] References Cited

U.S. PATENT DOCUMENTS

| | | | |
|---|---|---|---|
| 2,182,459 | 12/1939 | Vickers | 251/283 X |
| 2,461,529 | 2/1949 | Curtis et al. | 251/283 |
| 4,620,619 | 11/1986 | Emura et al. | 188/322.22 X |
| 4,821,851 | 4/1989 | Kruckemeier et al. | 188/299 X |
| 5,242,038 | 9/1993 | Yamaoka | 188/285 X |
| 5,310,027 | 5/1994 | Nakamura et al. | 188/319 X |

*Primary Examiner*—Josie A. Ballato
*Attorney, Agent, or Firm*—Wenderoth, Lind & Ponack

[57] ABSTRACT

A cylinder (7) having a hydraulic fluid sealed therein is fitted with a piston (8) having a piston rod (9) connected thereto. The piston rod (9) is provided with a bypass passage (B) (generating relatively small damping force). The passage area of the bypass passage (B) is controlled by varying the area of orifices formed by guide ports (21 and 22) and shutter ports (24 and 25) by rotating a shutter (23), thereby changing damping force characteristics. Auxiliary ports (34 and 35) are provided to open into the guide ports (21 and 22), respectively. The hydraulic fluid jetted out into the shutter (23) from the orifices formed by the guide ports (21 and 22) and the shutter ports (24 and 25) is directed to flow approximately perpendicularly to the direction of sliding of the shutter (23) by the hydraulic fluid jetted out from the auxiliary ports (34 and 35), thereby reducing the hydrodynamic force acting in the sliding direction of the shutter (23), and thus minimizing the force required to actuate and hold the shutter (23).

3 Claims, 3 Drawing Sheets

SHOCK ABSORBER WITH AUXILIARY PORT IN GUIDE MEMBER TO CONTROL HYDRODYNAMIC FORCE

BACKGROUND OF THE INVENTION

1. Field of the Invention

The present invention relates to a damping force control type hydraulic shock absorber attached to a suspension system of a vehicle, for example, an automobile.

2. Description of the Related Art

Hydraulic shock absorbers attached to suspension systems of automobiles or other vehicles include damping force control type hydraulic shock absorbers which are designed so that the level of damping force can be properly controlled in accordance with the road surface conditions, vehicle running conditions, etc., with a view to improving the ride quality and the steering stability.

In general, this type of hydraulic shock absorber includes a cylinder having a hydraulic fluid sealed therein, and a piston which has a piston rod connected thereto and which is slidably fitted in the cylinder to define therein two cylinder chambers. The two cylinder chambers are communicated with each other by a main hydraulic fluid passage and a bypass passage. The main hydraulic fluid passage is provided with a damping force generating mechanism (including an orifice, a disk valve, etc.) for generating relatively large damping force. The bypass passage is provided with a damping force generating mechanism for generating relatively small damping force, and with a damping force control valve for opening and closing the bypass passage.

With the above-described arrangement, when the damping force control valve is opened, the hydraulic fluid in the cylinder is induced to flow mainly through the bypass passage by the sliding movement of the piston caused by the extension and contraction of the piston rod, thereby generating relatively small damping force. Accordingly, the damping force characteristics are "soft" during both the extension and contraction strokes. When the damping force control valve is closed, the hydraulic fluid in the cylinder is induced to flow through only the main hydraulic fluid passage by the sliding movement of the piston caused by the extension and contraction of the piston rod, thereby generating relatively large damping force. Accordingly, the damping force characteristics are "hard" during both the extension and contraction strokes. Thus, the damping force characteristics can be changed by opening and closing the damping force control valve.

The above-described damping force control valve has a guide member and a shutter adapted to be slidable relative to it. A guide port provided in the guide member and a shutter port provided in the shutter are arranged to form a variable orifice. When the hydraulic fluid passage area defined by the orifice is small, the hydraulic fluid passing through it flows out in the form of a jet. Since the jet of hydraulic fluid is spouted at an angle to a direction perpendicular to the direction of sliding of the shutter, hydrodynamic force acts on the shutter, producing an adverse effect on the control of the sliding movement of the shutter.

SUMMARY OF THE INVENTION

In view of the above-described circumstances, it is an object of the present invention to provide a damping force control type hydraulic shock absorber designed so that the force required to actuate and hold the shutter of the damping force control valve is minimized.

To attain the above-described object, the present invention provides a damping force control type hydraulic shock absorber including a cylinder having a hydraulic fluid sealed therein, and a piston slidably fitted in the cylinder to define therein two cylinder chambers, which are communicated with each other through a main hydraulic fluid passage and a bypass passage provided with a damping force control valve, so that damping force is generated by controlling the flow of hydraulic fluid in the main hydraulic fluid passage and bypass passage caused by sliding movement of the piston in the cylinder. The passage area of the bypass passage is controlled by the damping force control valve, thereby enabling damping force characteristics to be controlled. The damping force control valve includes a guide member having a guide port, and a shutter adapted to be slidable relative to the guide member and having a shutter port positioned to be able to face the guide port. The area of an orifice formed by the guide and shutter ports is varied by sliding movement of the shutter, thereby controlling the passage area of the bypass passage. In addition, the guide member is provided with an auxiliary port for spouting a jet of hydraulic fluid so that the hydraulic fluid passing through the orifice is directed to flow approximately perpendicularly to the direction of sliding of the shutter by the jet of hydraulic fluid from the auxiliary port.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and of which.

DETAILED DESCRIPTION

With a view to facilitating understanding of the feature of the present invention, a damping force control valve of a damping force control type hydraulic shock absorber according to the prior art will first be described with reference to FIGS. 5 and 6.

Figure 5:
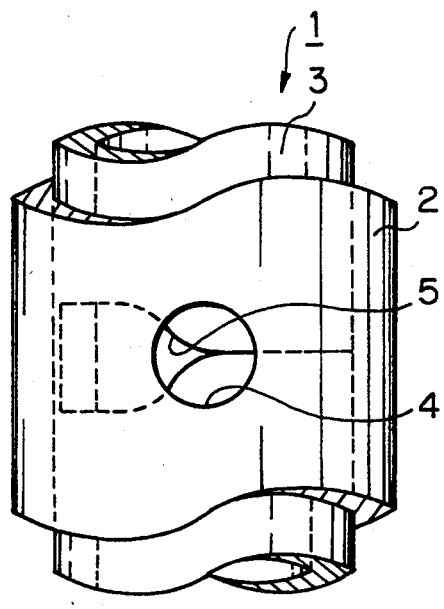
FIG. 5 is a front view showing a port portion of a damping force control valve of a conventional damping force control type hydraulic shock absorber.
Figure 6:
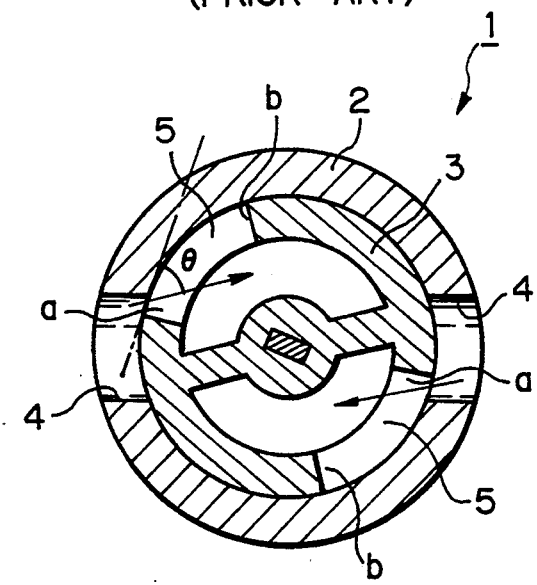
FIG. 6 is a transverse sectional view of the damping force control valve shown in FIG. 5.

As shown in FIGS. 5 and 6, the damping force control valve 1 includes a cylindrical guide member 2 and a cylindrical shutter 3 which is rotatably fitted in the guide member 2. The side wall of the guide member 2 is provided with guide ports 4, and the side wall of the shutter 3 is provided with shutter ports 5 positioned to be able to face the guide ports 4, respectively. The guide ports 4 and the shutter ports 5 constitute a part of a bypass passage. As the shutter 3 is rotated, the area of an orifice formed by each pair of guide and shutter ports 4 and 5 is varied, and thus the passage area of the bypass passage is controlled.

The conventional damping force control type hydraulic shock absorber having the damping force control valve 1 suffers, however, from the following problems. That is, when the area of the orifice formed by the guide and shutter ports 4 and 5 is small, the hydraulic fluid flows through the orifice at exceedingly high velocity and hence flows into the shutter 3 in the form of a jet flowing in the direction of the arrow shown in FIG. 6. At the end portion (shown by "a" in the figure) of the shutter port 5 that is closer to the guide port 4, the pressure lowers due to the change of momentum caused by the increase in the flow velocity of hydraulic fluid. At the other end portion (shown by "b" in the figure) of the shutter port 5, the pressure rises due to the change of dynamic pressure of the hydraulic fluid flowing into the shutter 3. The change of pressure in the shutter 3 produces hydrodynamic force that urges the shutter 3 to rotate clockwise as viewed in FIG. 6. Thus, the positioning accuracy of the shutter 3 is lowered by the rotational force acting thereon. Accordingly, it has heretofore been necessary to increase the output of an actuator (not shown) used to actuate the shutter 3 to rotate and position it against the hydrodynamic rotational force.

It should be noted that the force F produced by the steady flow of hydraulic fluid passing through the orifice formed by the guide and shutter ports 4 and 5 may be approximately expressed as follows:

$$F = \rho Q V \cdot \cos \theta \tag{1}$$

where
- $\rho$ is the density of the hydraulic fluid
- $Q$ is the flow rate
- $V$ is the flow velocity
- $\theta$ is the angle between the sliding surface defined between the guide member 2 and the shutter 3 on the one hand and the direction of flow of hydraulic fluid on the other.

The expression is well known in the field of valves used with hydraulic fluid.

One embodiment of the present invention will be described below in detail with reference to FIGS. 1 to 4.

Figure 1:
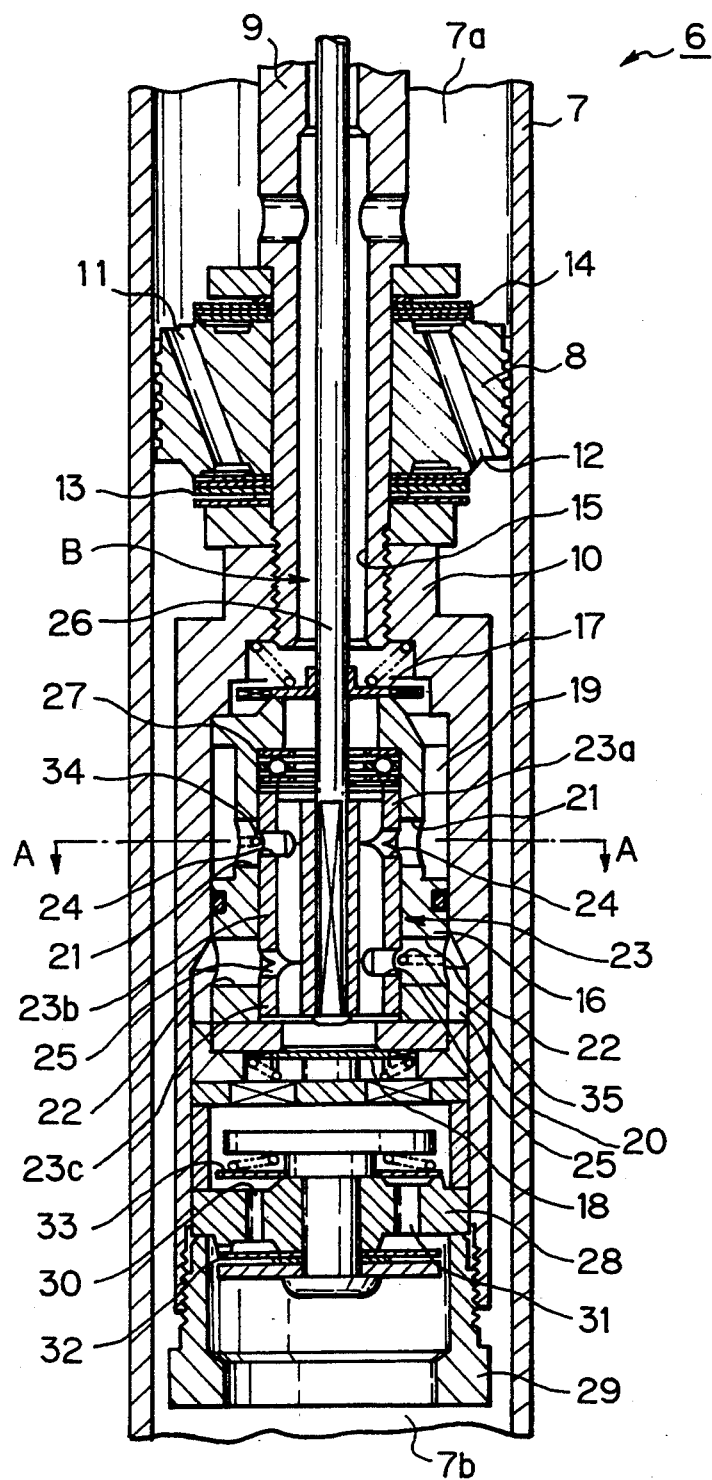
FIG. 1 is a longitudinal sectional view of one embodiment of the damping force control type hydraulic shock absorber according to the present invention.

As shown in FIG. 1, a damping force control type hydraulic shock absorber 6 includes a cylinder 7 having a hydraulic fluid sealed therein, and a piston 8 which is slidably fitted in the cylinder 7. The piston 8 divides the inside of the cylinder 7 into two chambers, that is, a cylinder upper chamber 7a and a cylinder lower chamber 7b. One end of a piston rod 9 extends through the piston 8. The piston rod 9 has a cylindrical passage member 10 screwed onto the inner end portion thereof, thereby being secured to the piston 8. The other end portion of the piston rod 9 extends as far as the outside of the cylinder 7 through a rod guide (not shown) and a seal member (not shown), which are provided in the upper end portion of the cylinder 7. In addition, the cylinder 7 is provided with a reservoir chamber (not shown) for compensating for a change in the volumetric capacity in the cylinder 7, which corresponds to the amount by which the piston rod 9 enters or withdraws from the cylinder 7, by compression or expansion of a gas sealed in the reservoir chamber.

The piston 8 is provided with an extension-side main hydraulic fluid passage 11 and a contraction-side main hydraulic fluid passage 12 for providing communication between the cylinder upper and lower chambers 7a and 7b. The end face of the piston 8 that is closer to the cylinder lower chamber 7b is provided with a damping force generating mechanism 13 having an orifice and disk valves which are adapted to generate damping force by controlling the flow of hydraulic fluid in the extension-side main hydraulic fluid passage 11. The end face of the piston 8 that is closer to the cylinder upper chamber 7a is provided with a damping force generating mechanism 14 having disk valves adapted to generate damping force by controlling the flow of hydraulic fluid in the contraction-side main hydraulic fluid passage 12.

The piston rod 9 is provided with a hydraulic fluid passage 15 which is communicated at one end thereof with the cylinder upper chamber 7a and at the other end thereof with the inside of the passage member 10, which is provided on the cylinder lower chamber side. The hydraulic fluid passage 15 and the passage member 10 constitute a bypass passage B that provides communication between the cylinder upper chamber 7a and the cylinder lower chamber 7b.

An approximately cylindrical guide member 16 is fitted in the passage member 10. One end of the guide member 16 is provided with a check valve 17 which allows the flow of hydraulic fluid from the inside of the guide member 16 toward the cylinder upper chamber 7a but prevents the flow of hydraulic fluid in the opposite direction. The other end of the guide member 16 is provided with a check valve 18 which allows the flow of hydraulic fluid from the inside of the guide member 16 toward the cylinder lower chamber 7b but prevents the flow of hydraulic fluid in the opposite direction.

Hydraulic fluid passages 19 and 20 are formed between the passage member 10 and the guide member 16 to constitute part of the bypass passage B. The hydraulic fluid passage 19 is communicated with the cylinder upper chamber 7a. The hydraulic fluid passage 20 is communicated with the cylinder lower chamber 7b. The side wall of the guide member 16 is provided with a pair of guide ports 21 communicated with the hydraulic fluid passage 19, and a pair of guide ports 22 communicated with the hydraulic fluid passage 20. The hydraulic fluid passage 19 and the guide ports 21 bypass the check valve 17. The hydraulic fluid passage 20 and the guide ports 22 bypass the check valve 18.

A cylindrical shutter 23 is rotatably fitted in the guide member 16. The side wall of the shutter 23 is provided with a pair of shutter ports 24 positioned to be able to face the guide ports 21, respectively, of the guide member 16. The side wall of the shutter 23 is further provided with a pair of shutter ports 25 positioned to be able to face the guide ports 22, respectively. The shutter ports 24 and 25 each extend in the circumferential direction of the shutter 23. The shutter ports 24 each have a portion formed in a wedge-like shape in which the opening width gradually enlarges toward one side. The shutter ports 25 each have a portion formed in a wedge-like shape in which the opening width gradually enlarges toward the opposite side to the above. As the shutter 23 is rotated, the area of an orifice formed by alignment of each pair of guide and shutter ports 21 and 24 varies, and thus the passage area of the hydraulic fluid passage that bypasses the check valve 17 is controlled. In addition, the area of an orifice formed by alignment of each pair of guide and shutter ports 22 and 25 varies, and thus the passage area of the hydraulic fluid passage that bypasses the check valve 18 is controlled.

The shutter mechanism is arranged as follows: When the orifice formed by the guide and shutter ports 21 and 24 is fully open, the orifice formed by the guide and shutter ports 22 and 25 is fully closed. As the shutter 23 is rotated in one direction in this state, the area of the orifice formed by the guide and shutter ports 21 and 24 decreases, and at the same time, the area of the orifice formed by the guide and shutter ports 22 and 25 increases. When the orifice formed by the guide and shutter ports 21 and 24 is fully closed, the orifice formed by the guide and shutter ports 22 and 25 is fully open.

A control rod 26 is connected to the shutter 23. The control rod 26 extends through the check valve 17 and further extends along the piston rod 9 as far as the outside of the hydraulic shock absorber 6 so that the shutter 23 can be rotated through the control rod 26 by an actuator (not shown) from the outside of the hydraulic shock absorber 6. The shutter 23 is composed of three members 23a, 23b and 23c, which are joined together by the control rod 26. It should be noted that reference numeral 27 in the figure denotes a bearing for supporting the shutter 23 so that the shutter 23 can be rotated with minimal torque. The inner peripheral part of the bearing 27 is formed with a hydraulic fluid passage.

A valve body 28 is fitted in an opening of the passage member 10 at an end thereof closer to the cylinder lower chamber 7b and secured to the passage member 10 by using a screw member 29. The valve body 28 is provided with two hydraulic fluid passages 30 and 31 for providing communication between the inside of the passage member 10 and the cylinder lower chamber 7b. One end of the valve body 28 is provided with a damping force generating mechanism 32 having an orifice and a disk valve which are adapted to generate damping force by controlling the flow of hydraulic fluid in the hydraulic fluid passage 30. The other end of the valve body 28 is provided with a check valve 33 that allows the flow of hydraulic fluid from the cylinder lower chamber 7b toward the inside of the passage member 10 through the hydraulic fluid passage 31.

Next, the guide member 16 and the shutter 23, which constitute a damping force control valve as an essential part of the present invention, will be explained more specifically.

Figure 2:
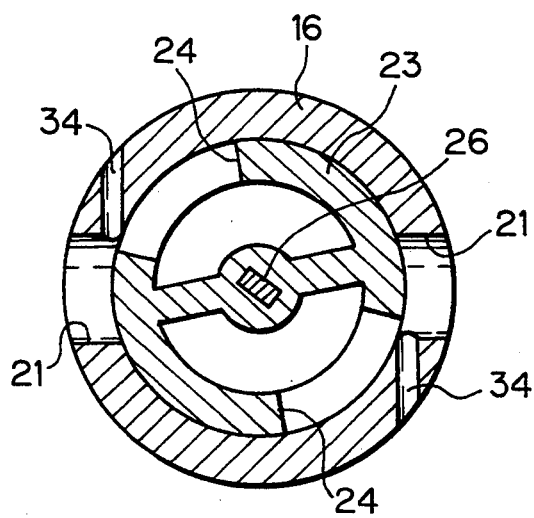
FIG. 2 is an enlarged sectional view taken along the line A—A in FIG. 1, showing a guide member and a shutter in the hydraulic shock absorber.
Figure 3:
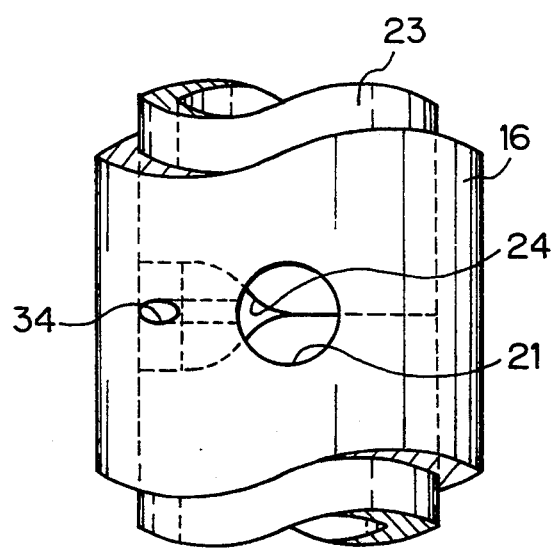
FIG. 3 is a front view showing a port portion of a damping force control valve composed of the guide member and the shutter, which constitutes an essential part of the hydraulic shock absorber illustrated in FIG. 1.
Figure 4:
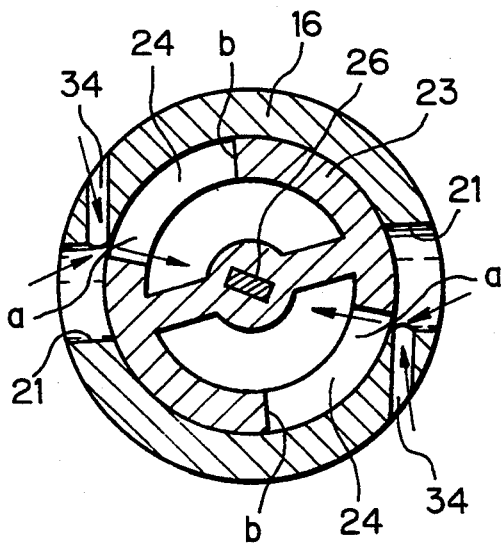
FIG. 4 is a transverse sectional view showing the flow of hydraulic fluid through ports inside the damping force control valve, which is composed of the guide member and the shutter, in the hydraulic shock absorber shown in FIG. 1.

As shown in FIGS. 2 and 3, the side wall of the guide member 16 is provided with auxiliary ports 34 having a relatively small diameter and extending approximately tangentially to the sliding surface defined between the guide member 16 and the shutter 23. One end of each auxiliary port 34 opens to the downstream end portion of the guide port 21 (closer to the shutter 23). The other end of the auxiliary port 34 opens to the outer peripheral surface of the guide member 16. The auxiliary ports 34 are each disposed to open near an orifice formed by a pair of guide and shutter ports 21 and 24 when the area of the orifice is small.

Similarly, the side wall of the guide member 16 is provided with auxiliary ports 35 (see FIG. 1) having a relatively small diameter and extending approximately tangentially to the inner peripheral surface of the guide member 16. One end of each auxiliary port 35 opens to the downstream end portion of the guide port 22 (closer to the shutter 23) thereof. The other end of the auxiliary port 35 opens to the outer peripheral surface of the guide member 16. The auxiliary ports 35 are each disposed to open near an orifice formed by a pair of guide and shutter ports 22 and 25 when the area of the orifice is small.

The operation of this embodiment, arranged as described above, will be explained below.

Damping force characteristics can be changed by rotating the shutter 23 with the control rod 26 operated externally.

When the shutter 23 is rotated so that the orifice formed by each pair of guide and shutter ports 21 and 24 is fully open, while the orifice formed by each pair of guide and shutter ports 22 and 25 is fully closed, the hydraulic fluid in the cylinder 7 flows as follows: During the extension stroke of the piston rod 9, the hydraulic fluid in the cylinder upper chamber 7a flows toward the cylinder lower chamber 7b through the bypass passage B as follows: The hydraulic fluid closes the check valve 17, flows through the hydraulic fluid passage 19, the guide ports 21 and the shutter ports 24, opens the check valve 18, and flows into the cylinder lower chamber 7b through the hydraulic fluid passage 30 provided in the valve body 28. Thus, relatively small damping force is generated because of the large area of the orifice formed by each pair of guide and shutter ports 21 and 24 and by the action of the damping force generating mechanism 32. On the other hand, during the contraction stroke of the piston rod 9, since the check valve 18 is closed and the orifices formed by the guide and shutter ports 22 and 25 have been closed, the bypass passage B is closed. Accordingly, the hydraulic fluid flows only through the contraction-side main hydraulic fluid passage 12 in the piston 8, causing relatively large damping force to be generated by the damping force generating mechanism 14. Thus, the damping force characteristics are "soft" during the extension stroke and "hard" during the contraction stroke.

When the shutter 23 is rotated in one direction from the above-described position so that the area of the orifice formed by each pair of the guide and shutter ports 21 and 24 is reduced, while the orifice formed by each pair of guide and shutter ports 22 and 25 is opened, the hydraulic fluid in the cylinder 7 flows as follows: During the extension stroke of the piston rod 9, the hydraulic fluid in the cylinder upper chamber 7a flows toward the cylinder lower chamber 7b through the bypass passage B in the same way as the above, and the damping force increases by an amount corresponding to the reduction in the area of the orifice formed by each pair of guide and shutter ports 21 and 24. On the other hand, during the contraction stroke of the piston rod 9, the hydraulic fluid in the cylinder lower chamber 7b flows toward the cylinder upper chamber 7a through the bypass passage B as follows: The hydraulic fluid opens the check valve 33 provided on the valve body 28, closes the check valve 18 provided on the guide member 16, flows through the hydraulic fluid passage 20, the guide ports 22 and the shutter ports 25, opens the check valve 17, and flows into the cylinder upper chamber 7a. Accordingly, an opening defined by each pair of guide and shutter ports 22 and 25 forms an orifice, so that relatively small damping force (orifice characteristics) is generated in accordance with the orifice area. Thus, the damping force characteristics are "medium" during both the extension and contraction strokes.

When the shutter 23 is further rotated in the same direction from the above-described position so that the orifice formed by each pair of guide and shutter ports 21 and 24 is fully closed, while the orifice formed by each pair of guide and shutter ports 22 and 25 is fully open, the hydraulic fluid in the cylinder 7 flows as follows: During the extension stroke of the piston rod 9, since the check valve 17 is closed and the orifices formed by the guide and shutter ports 21 and 24 have been closed, the bypass passage B is closed. Accordingly, the hydraulic fluid flows only through the extension-side main hydraulic fluid passage 11 in the piston 8, causing relatively large damping force to be generated by the damping force generating mechanism 13. On the other hand, during the contraction stroke of the piston rod 9, the hydraulic fluid in the cylinder lower chamber 7b flows toward the cylinder upper chamber 7a through the bypass passage B in the same way as the above, and the damping force (orifice characteristics) decreases by an amount corresponding to the increase in the area of the orifice formed by each pair of guide and shutter ports 22 and 25. Accordingly, the damping force characteristics are "hard" during the extension stroke and "soft" during the contraction stroke.

Thus, it is possible to set different damping force characteristics for the extension and contraction strokes. In addition, the area of the orifices formed by guide and shutter ports 21 and 24 and the area formed by the guide and shutter ports 22 and 25 can be continuously changed in accordance with the angle of rotation of the shutter 23. Accordingly, the damping force characteristics can be continuously controlled by varying the passage area of the bypass passage B for the extension and contraction strokes. The shutter mechanism may also be arranged so that "hard" characteristics are available for both the extension and contraction strokes by closing the bypass passage B with all the guide ports 21 and 22 closed by the shutter 23.

The following is a description of the function of the auxiliary ports 34 and 35 provided in the guide member 16 of the damping force control valve. These ports constitute an essential part of the present invention. Since the auxiliary ports 34 and 35 have the same function, the auxiliary ports 34 alone will be explained below.

As shown in FIGS. 2 and 3, when the shutter 23 is rotated in one direction to reduce the area of the orifice formed by each pair of guide and shutter ports 21 and 24, the hydraulic fluid in the hydraulic fluid passage 19 passes through the orifice formed by the guide and shutter ports 21 and 24 and flows into the shutter 23 in the form of a jet. In the invention, the jet of hydraulic fluid is spouted generally toward the axles of rotation of the shutter 23 (i.e., toward the control rod 26) because of collision with a jet of hydraulic fluid that flows into the shutter 23 from the hydraulic fluid passage 19 through the auxiliary port 34, as shown by the arrows in FIG. 4. That is, the hydraulic fluid passing through the orifice formed by each pair of guide and shutter ports 21 and 24 is jetted out approximately perpendicularly to the direction of sliding of the shutter 23. Thus, it is possible to obtain a condition which is the same as a condition obtained when θ in the above-described expression (1) is approximately equal to 90°. Consequently, the hydrodynamic force acting on the shutter 23 becomes satisfactorily small. In addition, at the end portion (shown by "a" in FIG. 4) of the shutter port 24 that is closer to the guide port 21, the jet of hydraulic fluid passing through the orifice is effectively stirred by the jet spouted out from the auxiliary port 34, so that the action which would lower the pressure is eliminated. As noted above, the jet of hydraulic fluid is spouted into the shutter 23 toward the axles of rotation of the shutter 23. Accordingly, no dynamic pressure is established by the jet at the opposite end (shown by "b" in FIG. 4) of the shutter port 24, and hence there is no rise in the pressure. Thus, no hydrodynamic rotational force acts on the shutter 23, and it is therefore possible to minimize the force required to actuate and hold the shutter 23.

Although in the foregoing embodiment the auxiliary ports 34 open into the guide ports 21 and extend approximately tangentially to the sliding surface defined between the guide member 16 and the shutter 23, it should be noted that the present invention is not necessarily limited thereto and that it is possible to adopt any arrangement whereby a hydraulic fluid can be jetted out so that the jet of hydraulic fluid from an orifice formed by a pair of guide and shutter ports 21 and 24 is directed toward the axis of rotation of the shutter 23. For example, the auxiliary ports 34 may open on the inner wall of the guide member 16. The inclination of each auxiliary port 34 with respect to the tangent to the sliding surface defined between the guide member 16 and the shutter 23 may be set at about 30°, at which the auxiliary port 34 can easily be machined by drilling. The auxiliary port 34 may be composed of a plurality of ports.

A test has been carried out to compare maximum torques for rotating the shutters among the test samples I-III which are different in the following features:
I. There is no auxiliary port (belonging to prior art);
II. With auxiliary ports extending tangentially to the sliding surface (the embodiment shown in the drawings); and
III. With auxiliary ports extending at about 30° to the sliding surface (the modified form described in the paragraph just above).

The following figures were attained as the maximum torques for rotating the shutters:
I. 0.067 (N·m)
II. 0.037 (N·m)
III. 0.047 (N·m)

In this test, the diameter of each guide port was 5 mm and the diameter of each auxiliary port was 1 mm. The rate of the flow of the hydraulic fluid was commensurate with a piston speed of 0.6 (m/s). By this test, the inventors confirmed that although the effectiveness of the modified form (sample III with auxiliary ports extending at 30°) is less than that of the illustrated embodiment (sample II), it is sufficiently better than that of the conventional device (sample I) and, therefore, the modified form is also useful.

Although in the above-described embodiment the present invention is applied to a damping force control type hydraulic shock absorber which makes it possible to set different damping force characteristics for the extension and contraction sides, the present invention is also similarly applicable to an ordinary damping force control type hydraulic shock absorber adapted to control damping force by controlling the passage area of the bypass passage.

Further, although in the foregoing embodiment the damping force control valve is provided on the piston assembly, it should be noted that the present invention is not necessarily limited thereto but may also be applied to a hydraulic shock absorber in which the bypass passage is provided outside the cylinder, and the damping force control valve is also provided outside the cylinder.

As has been detailed above, the damping force control type hydraulic shock absorber of the present invention has auxiliary ports provided in the guide member of the damping force control valve, so that the flow of hydraulic fluid jetted out from an orifice formed by each pair of guide and shutter ports is made approximately perpendicular to the direction of sliding of the shutter by the collision with the hydraulic fluid jetted out from the auxiliary port. Accordingly, the hydrodynamic force acting in the sliding direction of the shutter decreases, and it is therefore possible to minimize the force required to actuate and hold the shutter. Consequently, the shutter positioning accuracy can be improved. In addition, since it is possible to minimize the output of the actuator required to actuate the shutter, the actuator can be reduced in size.

What is claimed is:

1. A damping force control type hydraulic shock absorber including a cylinder having a hydraulic fluid sealed therein, and a piston slidably fitted in said cylinder to define therein two cylinder chambers, which are communicated with each other through a main hydraulic fluid passage and a bypass passage provided with a damping force control valve, so that damping force is generated by controlling the flow of hydraulic fluid in said main hydraulic fluid passage and bypass passage caused by sliding movement of said piston in said cylinder, and the passage area of said bypass passage is controlled by said damping force control valve, thereby enabling damping force characteristics to be controlled, wherein said damping force control valve comprises a guide member having a guide port, and a shutter adapted to be slidable relative to said guide member and having a shutter port positioned to be able to face said guide port, so that the area of an orifice formed by said guide and shutter ports is varied by sliding movement of said shutter, thereby controlling the passage area of said bypass passage, said guide member being provided with an auxiliary port for spouting a jet of hydraulic fluid so that the hydraulic fluid passing through said orifice is directed to flow approximately perpendicularly to a direction of sliding of said shutter by the jet of hydraulic fluid from said auxiliary port.

2. A damping force control type hydraulic shock absorber according to claim 1, wherein said guide port extends through a wall of the guide member so that it has opposite open ends, one of the open ends facing said shutter, said auxiliary port opening in the vicinity of said one open end of the guide port.

3. A damping force control type hydraulic shock absorber according to claim 2, wherein said guide member is a cylindrical member which rotatably receives said shutter, said auxiliary port extending substantially in parallel with a line drawn tangentially from the sliding surface defined between the guide member and the shutter.

* * * * *